United States Patent [19]

Hicks

[11] Patent Number: 5,480,347
[45] Date of Patent: Jan. 2, 1996

[54] FISH DEHEADING MACHINE

[75] Inventor: Timothy S. Hicks, Seattle, Wash.

[73] Assignee: Flohr Metal Fabricators, Inc., Seattle, Wash.

[21] Appl. No.: 324,880

[22] Filed: Oct. 17, 1994

[51] Int. Cl.⁶ .................................................. A22C 25/14
[52] U.S. Cl. ................................................ 452/170; 452/64
[58] Field of Search ............................ 452/170, 180, 452/64, 108, 106

[56] References Cited

U.S. PATENT DOCUMENTS

| | | | |
|---|---|---|---|
| 2,625,708 | 1/1953 | Gates | 452/170 |
| 3,530,532 | 9/1970 | Elich | 452/108 |
| 3,670,363 | 6/1972 | Hogan et al. | 452/170 |
| 3,843,998 | 10/1974 | Wenzel | 452/108 |
| 4,084,293 | 4/1978 | Hogan et al. | 452/170 |
| 4,215,452 | 8/1980 | Nagrotzki | 452/108 |
| 4,307,491 | 12/1981 | Dafgard | 452/108 |
| 4,463,478 | 8/1984 | Hartmann et al. | 452/170 |
| 4,551,885 | 11/1985 | Molnar | 452/170 |
| 4,599,765 | 7/1986 | Kristinsson | 452/170 |
| 4,635,318 | 1/1987 | Braeger et al. | 452/170 |

*Primary Examiner*—Willis Little
*Attorney, Agent, or Firm*—Seed and Berry

[57] ABSTRACT

A fish processing machine has a deheading station and a finishing station at which the throat tissue of the deheaded fish is removed. These stations are located on a reciprocating carriage in conjunction with a main body conveyor, a head positioning conveyor and a hold-down conveyor which are continuously advancing and positioning the fish being processed. The shuttle cycle of the carriage is controlled so that it is completed in the time period that a fish on the main conveyor advances the distance between conveyor flights.

17 Claims, 12 Drawing Sheets

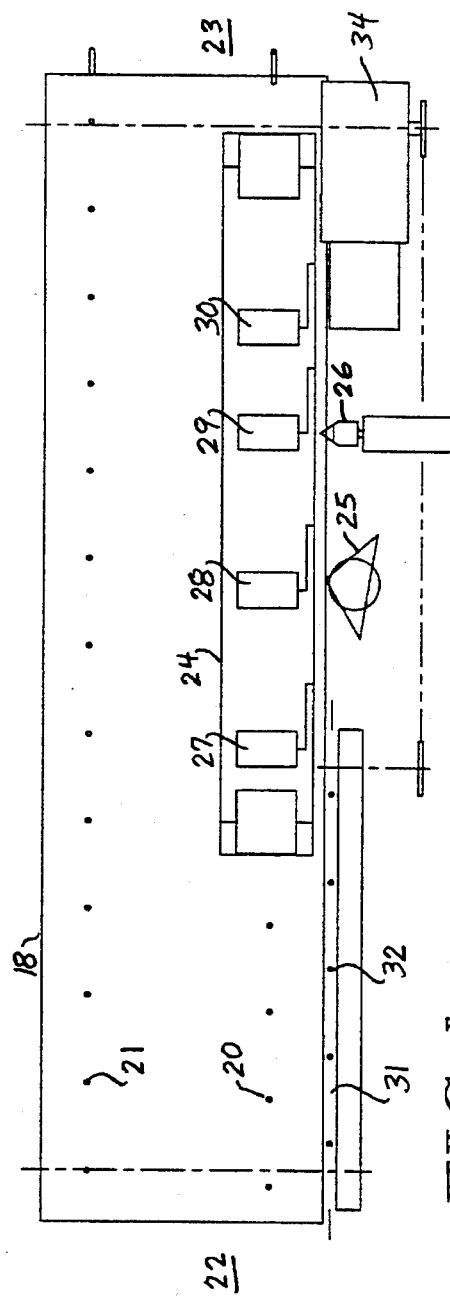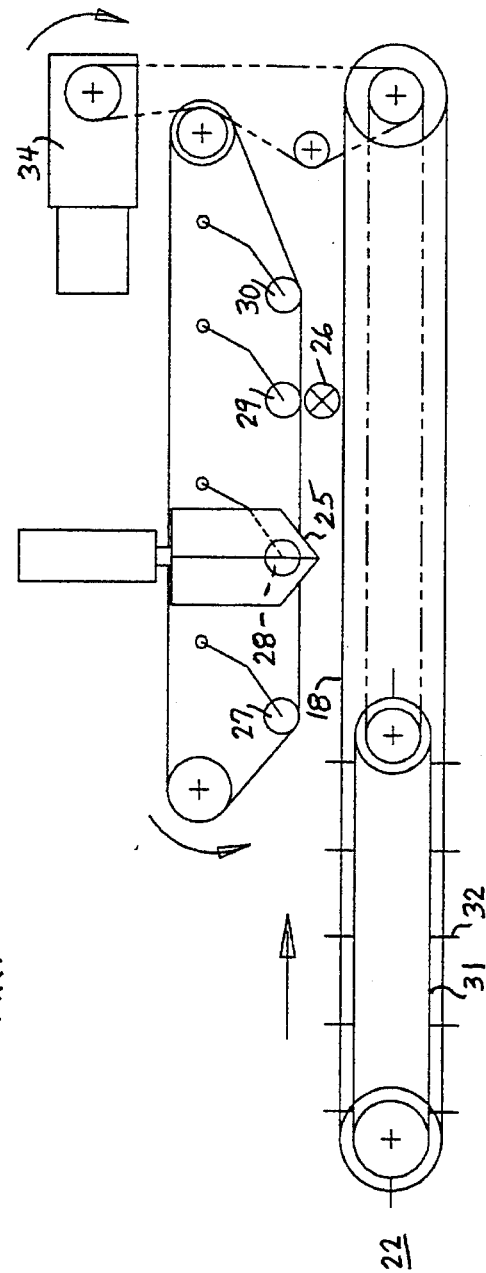
FIG. 1
PRIOR ART
FIG. 2

FISH DEHEADING MACHINE

TECHNICAL FIELD

The present invention relates to fish processing machine of the type in which fish are deheaded and then the throat tissue of the deheaded fish is cut free from the body in a continuous process while the fish are conveyed.

BACKGROUND OF THE INVENTION

As indicated in FIGS. 1–2, a prior art fish processing machine over which the present invention is an improvement, has a main conveyor 18 with sets of flight pins 20–21 at regular intervals for conveying fish from a loading station 22 to a discharge station 23 while they are being processed. A fish hold-down conveyor 24 travels over the main conveyor through part of its travel to keep the fish from shifting position while they are being deheaded by a guillotine blade 25 and then have their throat tissue cut by a rotary tool 26. The blade 25 and the throat cutting tool 26 are both rigidly mounted on the frame of the machine, and the lower run of the hold-down conveyor 24 is engaged by four spring-loaded hold-down rollers 27–30 swing mounted to the machine frame.

A pin chain 31 is mounted alongside part of the length of the main conveyor 20 and presents a series of rigidly mounted head-positioning pins 32 on a conveyor chain to engage the fish behind the gills in its gill opening when they are positioned crosswise to the main conveyor 18 with their heads projecting over the pin chain. The main conveyor 18, hold-down conveyor 24 and pin chain 31 are driven by a sprocket and chain drive at the same speed by a motor 34 having a variable speed drive for discontinuous operation so that the fish can be stationary while being processed by the guillotine blade and throat cutting tool.

The discontinuous motion of the described prior art machine makes operation on fish of varying sizes difficult due to the disturbance caused to the position of the fish by stopping and starting the conveyor. Small fish, which by the nature of the mechanism are less securely held than large fish, are apt to be disturbed more than the large ones. The result is an inacceptable variance between the head cuts of large and small fish. Because the head positioning pins 32 mounted on the pin chain 31 change orientation as they start around the head sprocket for the pin chain, they tend to push the head of a conveyed fish forwardly relative to the main conveyor as that fish advances beyond the pin chain. Because a small fish has less room in its gill opening to accommodate this relative motion, a small fish is affected more than a large one. The result further contributes to an unacceptable variance between the head cuts of large and small fish.

In the prior art machine adjustment of the position of the guillotine blade to control the slope of the cut for varying species and size ranges of fish is relatively difficult; the machine must be stopped so that bolts can be loosened and components moved by hand. The throat cutting mechanism 26 is large with significant inertia and a number of sliding components that are prone to noise and wear. The cutting head mounted on the throat cutting mechanism contains exposed knife blades that can easily damage the nape of the fish being processed.

SUMMARY OF THE INVENTION

The present invention corrects the deficiencies in the prior art processing machine by mounting the deheading and throat cutting apparatus on a shuttle carriage which reciprocates along the longitudinal axis of the machine in an advance and return cycle with a period equal to the time that it takes for the main conveyor to advance the distance between adjacent sets of fish positioning pins.

The shuttle carriage is driven with a mechanical crank off of the main conveyor drive system. The geometry is such that the motion of the carriage remains synchronized with the conveyor regardless of conveyor speed. The head positioning pins are pivotally mounted onto a roller chain such that they are unconstrained as said chain moves about its head sprocket with the result that no relative motion is imparted to the fish by the chain as the two separate. The guillotine blade mechanism and its anvil are suspended as a module from the shuttle carriage. Adjustment of the blade position is facilitated by moving the complete module with respect to the shuttle carriage using a pair of lead screws or other equivalent mechanism. The throat cutting operation is facilitated using a hybrid pneumatic cylinder designed such that the cylinder axis is the axis which the throat cutting head both moves along and rotates about. The result is a compact design that reduces inertia as well as the number of wearing surfaces. The cutting head is designed with the cutting surfaces shielded within a conical housing that both acts to ensure operation on the true center of the fish and protects the nape of the fish until such true center is found.

BRIEF DESCRIPTION OF THE DRAWINGS

FIGS. 1 and 2 are plan and elevational schematic views, respectively, of a prior art machine;

DETAILED DESCRIPTION OF THE INVENTION

In the present instance a person standing at the loading station 22 looking along the main conveyor toward the discharge station 23 will be considered to be looking in a forward direction, and the right and left sides of the conveyors and the machine shall be considered to be those at the right and left of such a person.

Figure 3:
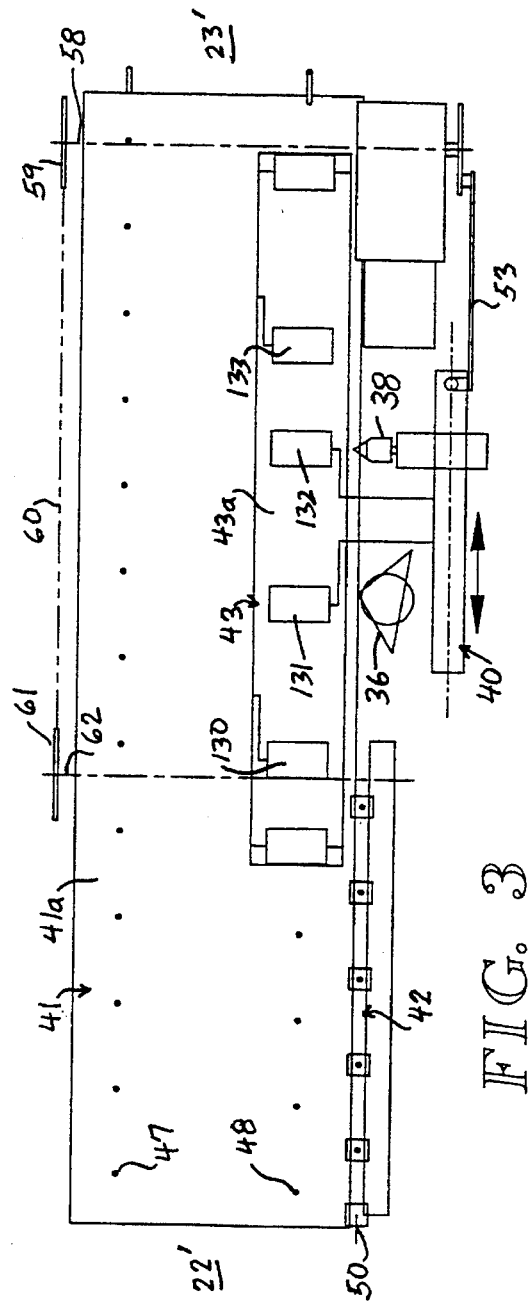
FIGS. 3 and 4 are plan and elevational schematic views, respectively, of a machine embodying the present inventions.
Figure 4:
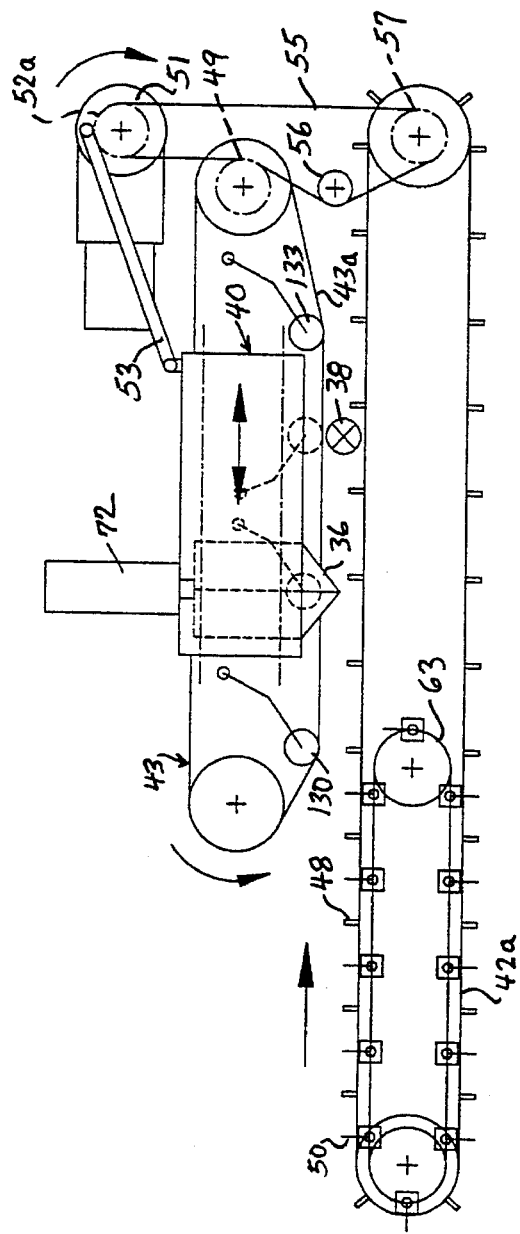
Figure 6:
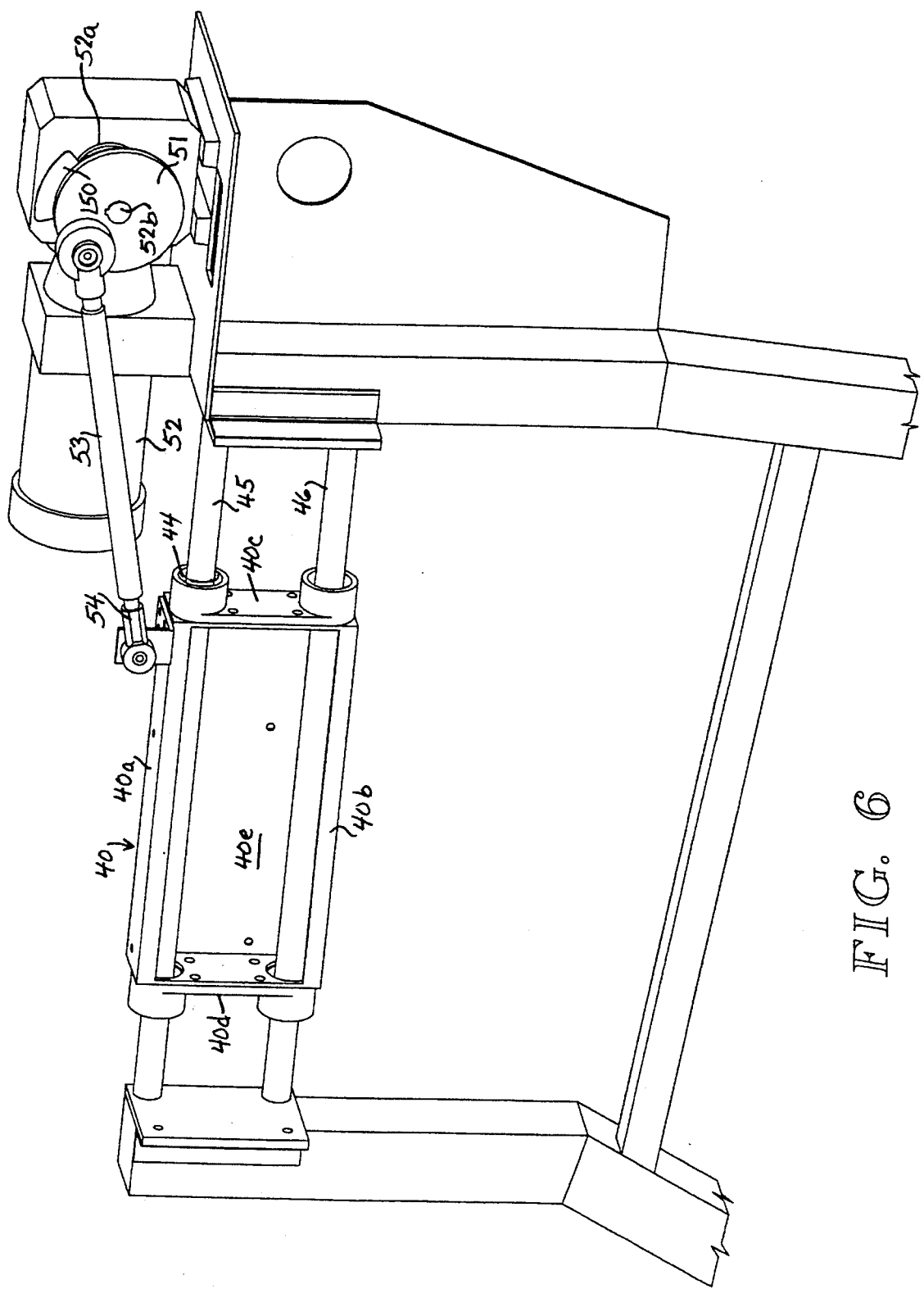
FIG. 6 is an isometric view from the right side of the machine showing the mechanism for shuttling the carriage, and with the components mounted on the carriage not being shown.
Figure 7:
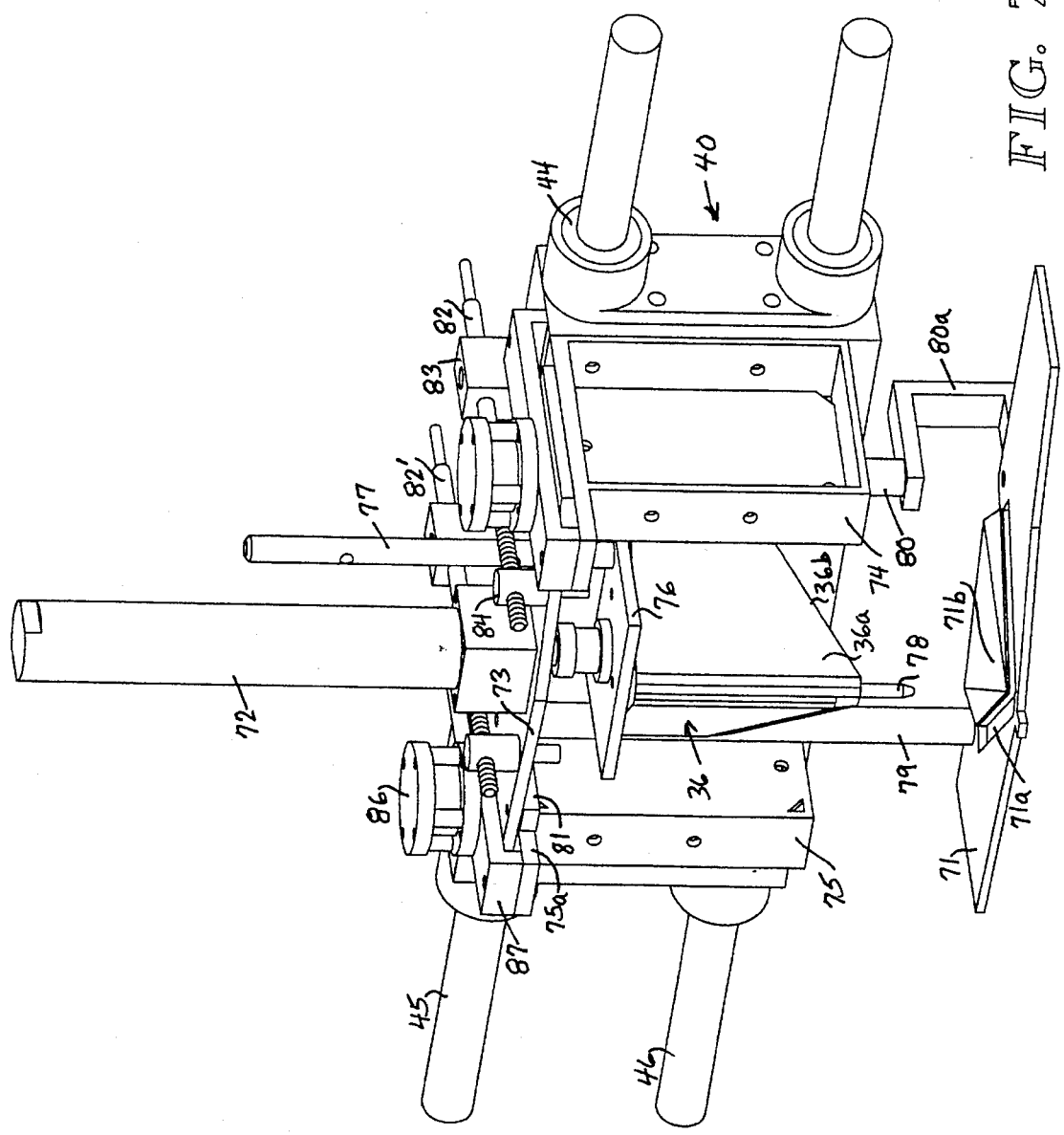
FIG. 7 is an isometric view from the left side of the carriage and looking forwardly showing the deheading mechanism.
Figure 8:
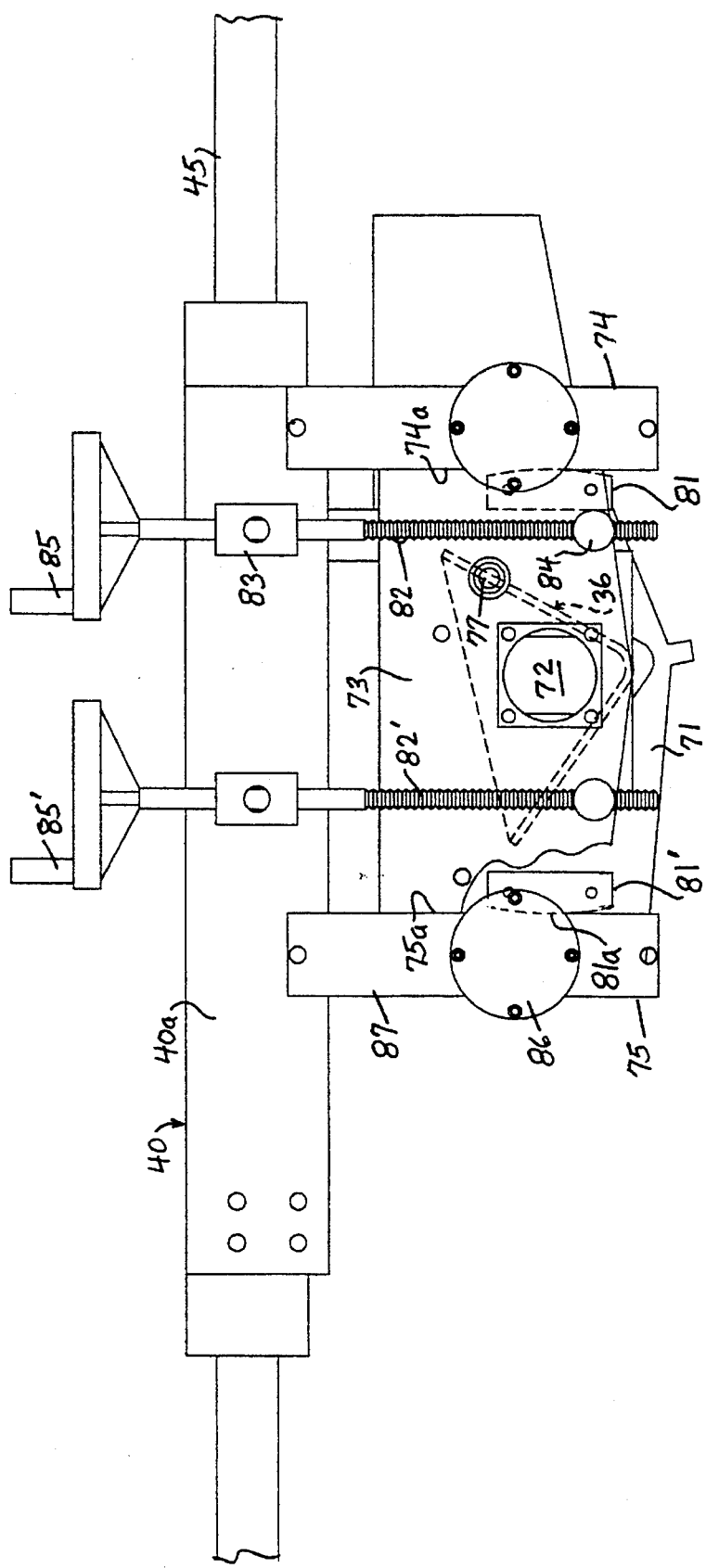
FIG. 8 is plan view of the deheading mechanism shown in FIG. 7.
Figure 10:
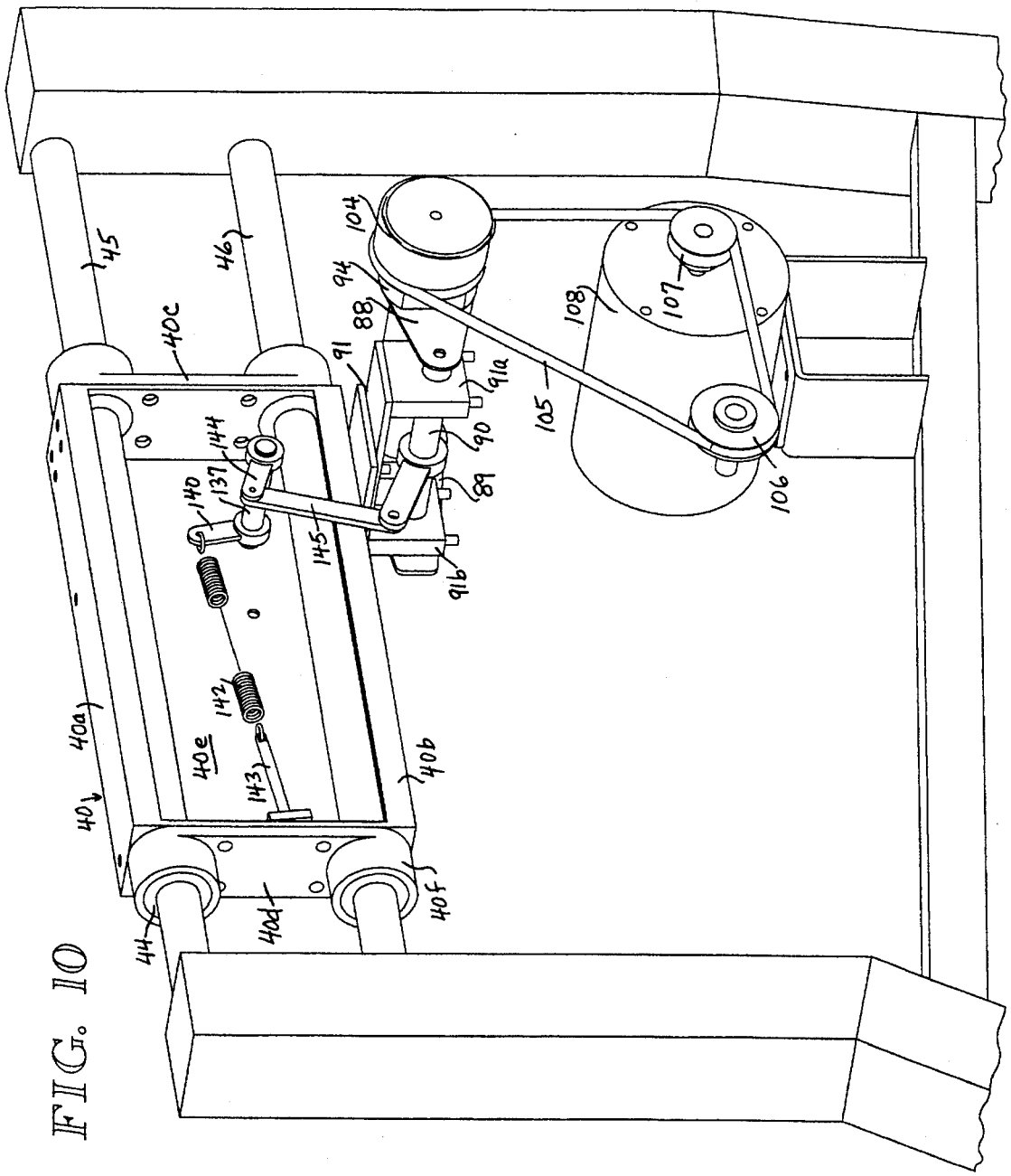
FIG. 10 is an isometric view from the right side of the carriage looking forward illustrating the mechanism for driving and controlling the elevation of the finishing cutter, and without the other parts supported by the carriage.
Figure 11:
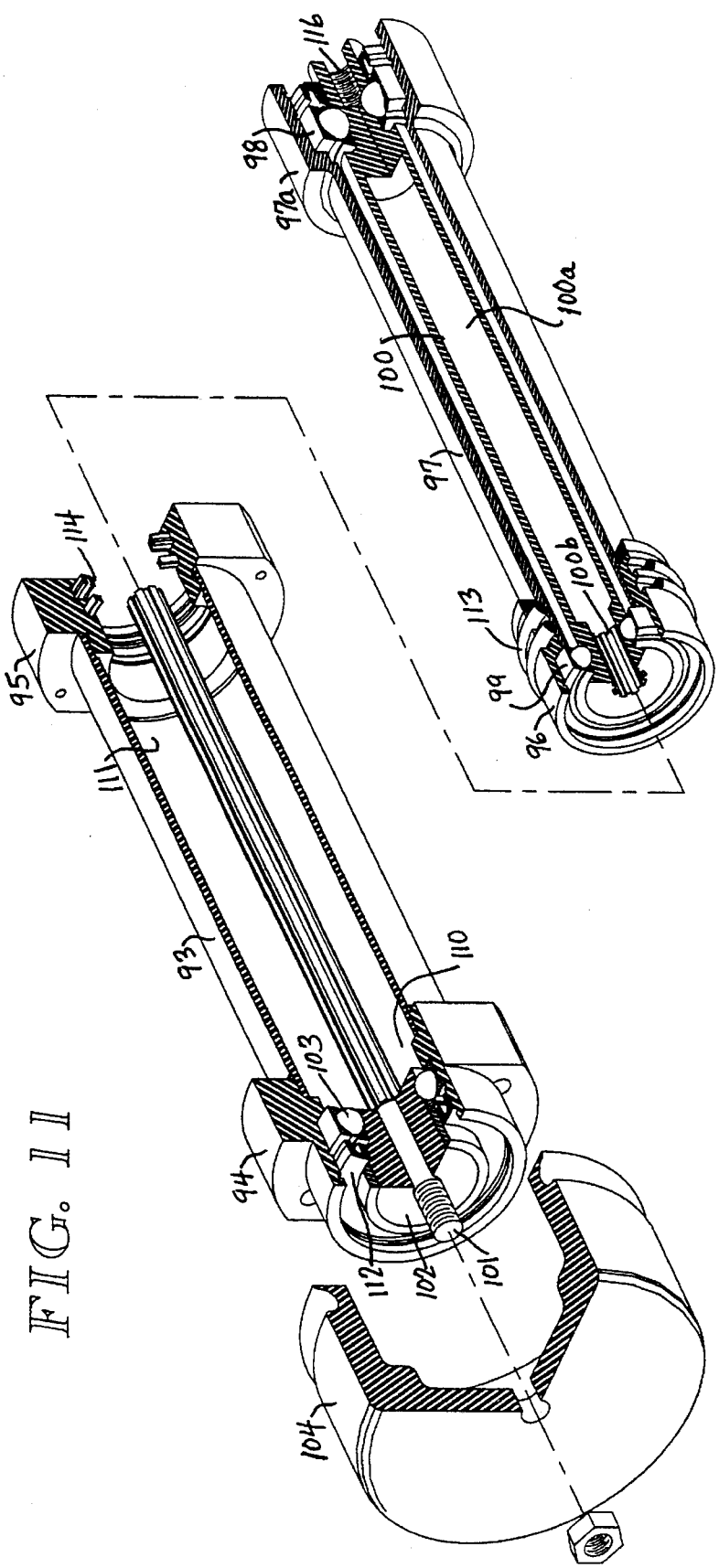
FIG. 11 is an exploded isometric view with parts broken away showing the mechanism for advancing and retracting the finishing cutter.

Referring to FIGS. 3–4, the processing machine of the present invention, as in the prior art, conveys each fish along a linear processing path with the fish positioned transversely of the path. As the fish progresses along the path a vertically moving guillotine blade 36 severs the head at a deheading station, and then a rotary finishing tool 38 advances axially into the gullet of the fish to sever the throat tissue at a finishing station. Unlike the prior art machine, the guillotine blade and finishing tool operate on the fish while the fish is being conveyed, and this is accomplished by mounting the operating mechanisms for the guillotine blade and finishing tool on a reciprocating shuttle carriage 40 which moves parallel to the linear processing path. As can be seen in FIGS. 6 and 10, the frame of the shuttle carriage comprises a rectangular box having top and bottom rails 40a–40b, front and back end pieces 40c–40d, and a mounting plate 40e at the left side.

The processing machine has three conveyors, namely, a main fish-body transporting conveyor 41, a secondary head-positioning conveyor 42, and an overhead hold-down conveyor 43 all moving at the same speed. The main conveyor 41 has an endless belt 41a extending from a rear loading station 22' to a front discharge station 23' and the secondary head positioning conveyor 42 has an endless chain 42a extending alongside the main conveyor from the rear loading station to an intermediate position spaced behind the guillotine blade 36. The overhead conveyor 43 has an endless belt 43a positioned above a right hand portion of the main conveyor and extends from a position slightly aft of the head of the secondary conveyor 42 to the unloading station, The shuttle carriage 40 is synchronized with the three conveyors 41–43 and is slide-mounted by linear bearings 44 on a pair of horizontally spaced guide rods 45–46 supported by the machine frame to position the shuttle frame above and to the right of the main conveyor 41. The bearings 44 are mounted in hubs 40f provided by the end pieces 40c–40d of the carriage frame. As previously indicated, the shuttle carriage carries the mechanism for operating the guillotine blade 36 and finishing tool 38 which are located forward of the secondary conveyor 42.

As in the prior art machine, the main conveyor has fish positioning flights which may be comprised of sets of left and right body positioning pins 47–48. These body positioning pins are complemented by head positioning pins 50 on the head-positioning conveyor 42 which are positioned slightly in advance of respective of the sets of pins on the main conveyor. All pins are spaced apart along the machine at the same interval, hereinafter referred to as the "conveyor pitch". The shuttle carriage 40 cycles in forward and return strokes in a total cycle period equal to that required for the conveyors to advance the distance of a conveyor pitch. This is a fixed relationship and is established by mounting a crank disc 51 to the drive sprocket 52a on the output shaft 52b of a stationary motor 52 for powering the conveyor system. Referring to FIGS. 3 and 6, the crank disc 51 is coupled by a connecting rod 53 and adjustable coupling 54 to the frame of the shuttle carriage 40, and the drive sprocket 52a is coupled to head sprockets 49, 57 for both the overhead conveyor 43 and the main conveyor 41, respectively, by an endless chain 55 which is tensioned by an idler 56. The chain 55 engages the front side of the head sprocket 49 for the overhead conveyor 43 and engages the underside of the head sprocket 57 of the main conveyor 41 so that these two conveyors operate in the same direction. Referring to FIG. 4, the left end of the head shaft 58 of the main conveyor 41 has a sprocket 59 driving a chain 60, to an intermediate sprocket 61 on a head shaft 62 for the secondary conveyor 42 whereby the secondary conveyor is driven in unison with the main conveyor. The ratio of the drive sprocket 52 to the driven sprockets is selected so that a single revolution of the drive sprocket 52a and crank disc 51 will advance the main and overhead conveyors 41, 43 in a conveyor single pitch. The throw of the crank disc 51 is such that the shuttle carriage 40 advances and returns through a complete cycle in time with the travel of one pitch of the main conveyor 41.

Figure 5:
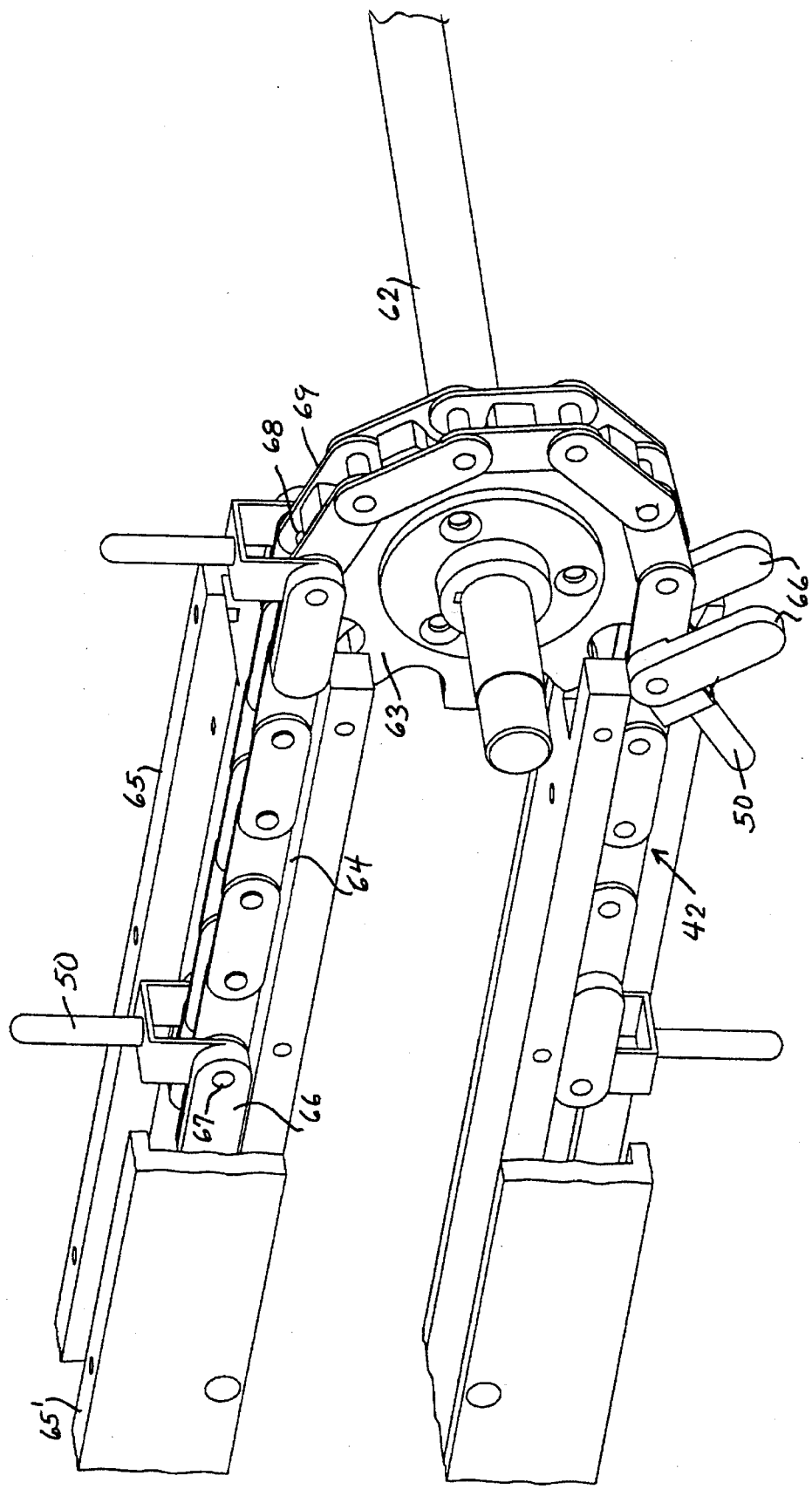
FIG. 5 is a fragmentary isometric view of the head positioning conveyor as seen from the right side of the machine.

The pins 47–48 on the main conveyor 41 project from mounting plates fixed to the conveyor belt 41a. On the other hand, as shown in FIG. 5, the pins on the head-positioning conveyor 42 are swing-mounted on the conveyor 42 so that they not only project upwardly during their travel along the upper run of the conveyor, but also are permitted to remain in upwardly projecting position as they pass around the upper forward quadrant of the head sprocket 63 of the head-positioning conveyor 42 rather than extending radially with respect to the head sprocket as they pass around this upper forward quadrant. In the preferred embodiment this is accomplished by providing a track 64 beneath a pair of laterally spaced head support strips 65–65' extending alongside the upper run of the head positioning conveyor 42 for receiving a pair of arms 66 fixed in trailing relation to each head positioning pin 50. Each such pin and arm assembly is pivotally mounted by way of a pivot pin 67 extending through a hollow pin 68 which interconnects the links 69 on the conveyor chain. In the alternative, for example, the head positioning pin 50 can be fixed to one leaf of a hinge having its other leaf fixed to the conveyor links 69 such that the hinge pin for the hinge is positioned in trailing relation to the head positioning pin.

Directing attention to the guillotine station, an adjustable guillotine module is provided including the guillotine blade 36, a bottom anvil 71, and a pneumatic cylinder unit 72 for operating the blade. The cylinder unit 72 is mounted on an adjustable support plate 73 which has its ends seated on a pair of box-like side brackets 74–75 extending to the left from the shuttle carriage 40. The piston rod 72a of the cylinder unit 72 extends through the support plate 73 to a top plate 76 on the guillotine blade 36. The blade is prevented from rotating relative to the rest of the guillotine module by a guide rod 77 which is connected to the top plate 76 and slides in an opening in the adjustable support plate 73.

The guillotine blade 36 has a pair of dihedral blade elements 36a which meet at a vertical intersection and are tapered at their lower end to provide a severing bottom edge 36b which is vee-shaped in elevation. A rod extends along the inside of the intersection of the blade elements 36a and projects below the tip of the blade as a guide pin 78.

The anvil 71 is suspended from the support plate 73 by a front hanger rod 79 and a rear hanger rod 80 having a bottom U-shaped hanger element 80a which is offset to the right to provide clearance for the heads of fish being conveyed onto the anvil. The anvil 71 has a vee-shaped slot 71a for passage of the lower end portion of the guillotine blade 36 and a tapered fish head seat 71b adjoining the slot.

A pair of arc plates 81–81' are mounted on the underside of the support plate and present arcuate outer end faces 81a which are arranged to engage opposed inner bracket faces 74a–75a adjoining the top of the brackets 74–75. The arcuate end faces 81a may have a radius of curvature centered at the center longitudinal axis of the cylinder 72. With this arrangement the support plate can be moved linearly between the bracket faces 74a–75a from right to left and vice versa, and also can be rotated in either direction. These adjustment motions are selectively performed by operation of a pair of parallel feed screws 82–82' retained against endwise movement in retainer blocks 83 mounted on the shuttle carriage 40. The feed screws 82–82' pass through a pair of nuts 84 seated on the support plate 73. These nuts 84 and the retainer blocks 83 each have respective pivot pins extending downwardly through bores in the support plate 73 and shuttle carriage 40. With this described arrangement simultaneous advancement or retraction of the feed screws 82–82' results in left or right movement of the support plate 73, whereas extension of one of the feed screws and retraction of the other feed screw results in a rotating movement of the support plate. Hence, the feed screws 82–82' can be used to shift the guillotine blade 36 and anvil 71 to the right or left, or to turn them, so that they can be properly positioned relative to the heads of the fish being processed. Adjustment of the feed screws can be performed manually from the right side of the machine by turning hand cranks 85–85' or by a suitable automatic system.

After the position of the guillotine blade 36 is adjusted the support plate 73 is clamped in the adjusted position against the top of the support brackets 74 by action of a pair of pneumatic locking cylinder units 86 which are mounted on a pair of headers 87 secured on the top of the shuttle carriage 40 and brackets 74. These headers 87 are recessed on their underside to receive respective end portions of the support plate 73. The piston rods of the locking cylinder units pass slidably through the headers 87 and engage the upper face of the support plate 73 to clamp it against the brackets 74–75 when the piston rods are extended into locking position. Air control valves are provided for controlling the locking cylinder units 86. These valves preferably connect to the locking cylinders via flexible hoses allowing for movement of the shuttle carriage and can be manually operated in conjunction with manual operation of the feed screws, or can be automatically operated.

Spaced in front of the head severing mechanism are a pair of forwardly directed rocker arms 88–89 which carry the finishing mechanism and are swing-mounted for vertical adjustment on a shaft 90 extending through legs 91a–91b depending from the shuttle carriage provided by a mounting unit 91 secured to the underside of the carriage 40 near the forward end thereof. Bolted to the rocker arms 88–89 is a cylinder assembly having a cylinder 93 fitting between right and left end rings 94–95 which are bolted to the rocker arms 88–89. A hollow double-acting piston 96 is slidably mounted in the cylinder 93 and has a tubular piston rod 97 extending to the left through the left end ring 95. The piston rod 97 has an enlarged head 97a at its left end containing a ball bearing unit 98 which is complemented by a ball bearing unit 99 mounted in the piston. A tool driver 100 is journaled in the ball bearing units 98–99 and has an elongated axial chamber 100a with a splined entry 100b at its right end which slidably receives a spline shaft 101. This spline shaft projects to the left from a collar 102 journaled in a bearing 103 which is mounted in the right end ring 94 of the cylinder and is coupled at its right end to a pulley 104. This pulley is driven by a stretchable belt 105 passing over an idler 106 and a drive pulley 107 driven by a stationary motor 108 mounted on the shuttle frame.

With the described arrangement rotation of the spline shaft 101 responsively rotates the tool driver 100 while leaving the latter free to move axially with the piston 96 and piston rod 97 while the spline shaft 101 remains held against endwise movement relative to the cylinder 93. Axial movement of the piston 96 and tool driver 100 are controlled by selectively introducing compressed air in the chambers 110–111 to the right and left of the piston 96. It is important to note that the right chamber 110 is isolated by a rotational seal 112 for the collar 102 on the spline shaft 101 and piston rings 113 on the piston, and the left chamber 111 is isolated by the piston rings 113 and a sliding seal 114 for the piston rod 97. The described arrangement avoids a need for a seal which is effective on a member which is rotating and also moving endwise.

Figure 12:
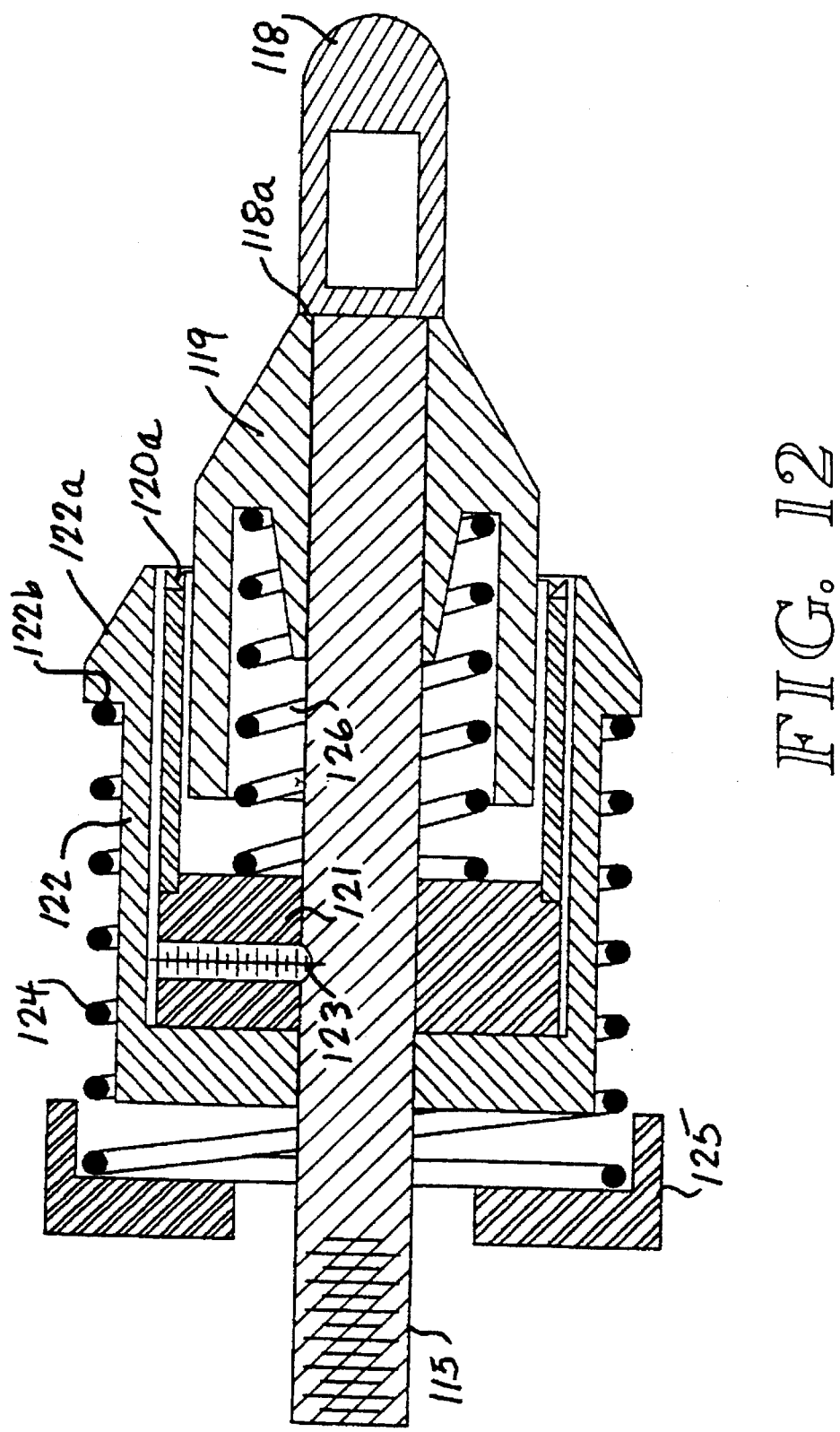
FIG. 12 is a longitudinal sectional view of the finishing cutter assembly which screw fits on the end of the mechanism shown in FIG. 11.

Referring to FIG. 12, the finishing tool has a central mandrel 115 which screws at an inner end into a threaded bore 116 at the outer end of the tool driver 100, and has a rounded guide nose 118 at its outer end. The guide nose 118 has a back shoulder 118a serving as a stop for outward travel of a tapered guide piece 119 which is slidably mounted on the mandrel 115. The guide piece 119 fits slidably in a cylindrical cutter 120 having teeth 120a at its outer end and a mounting disc 121 fixed to its inner end. A set screw 123 extends radially through the mounting disc 121 to lock the cutter 120 relative to the mandrel 115. Surrounding the cutter 120 is a shield 122 with a tapered nose 122a and annular seat 122b at the back of the nose for a compression spring 124 seated on a retainer 125. A second compression spring 126 seats on the mounting disc 121 and bears against the guide piece 119 to bias it toward the back shoulder 118a on the guide nose 118. When the finishing tool is mounted in operative position with the mandrel 115 screwed into the threaded bore 116, the retainer 125 seats against the outer end of the tool driver 100.

Referring to FIG. 14, operation of the finishing tool is illustrated responsive to extension of the piston rod 97 from a retracted position to bring the tool into engagement with the throat 128 of a deheaded fish 129. Frame A corresponds to the retracted position in which the parts of the tool are positioned as shown in FIG. 12. In frame B the guide nose 118 has entered the throat, and in frame C the guide piece 119 has engaged the fish and retracted relative to the advancing mandrel 115 in opposition to the spring 126 so as to expose the cutter teeth 120a outwardly of the tapered nose portion of the guide piece 119. As the mandrel 115 is further advanced the tapered nose 122a of the shield 122 engages the fish and also retracts relative to the advancing mandrel in opposition to the outer spring 124. This action, as indicated in frame D, fully exposes the cutter teeth 120a as they advance into cutting engagement with the throat tissue. As the mandrel 115 advances the mandrel is rotated by the rotating driver 100 which is driven via the spline coupling, driven pulley 104, belt 105, and drive pulley 107 from the stationary motor 108. The belt 105 stretches sufficiently to permit the carriage to move while the cutter 120 is operating.

Figure 9:
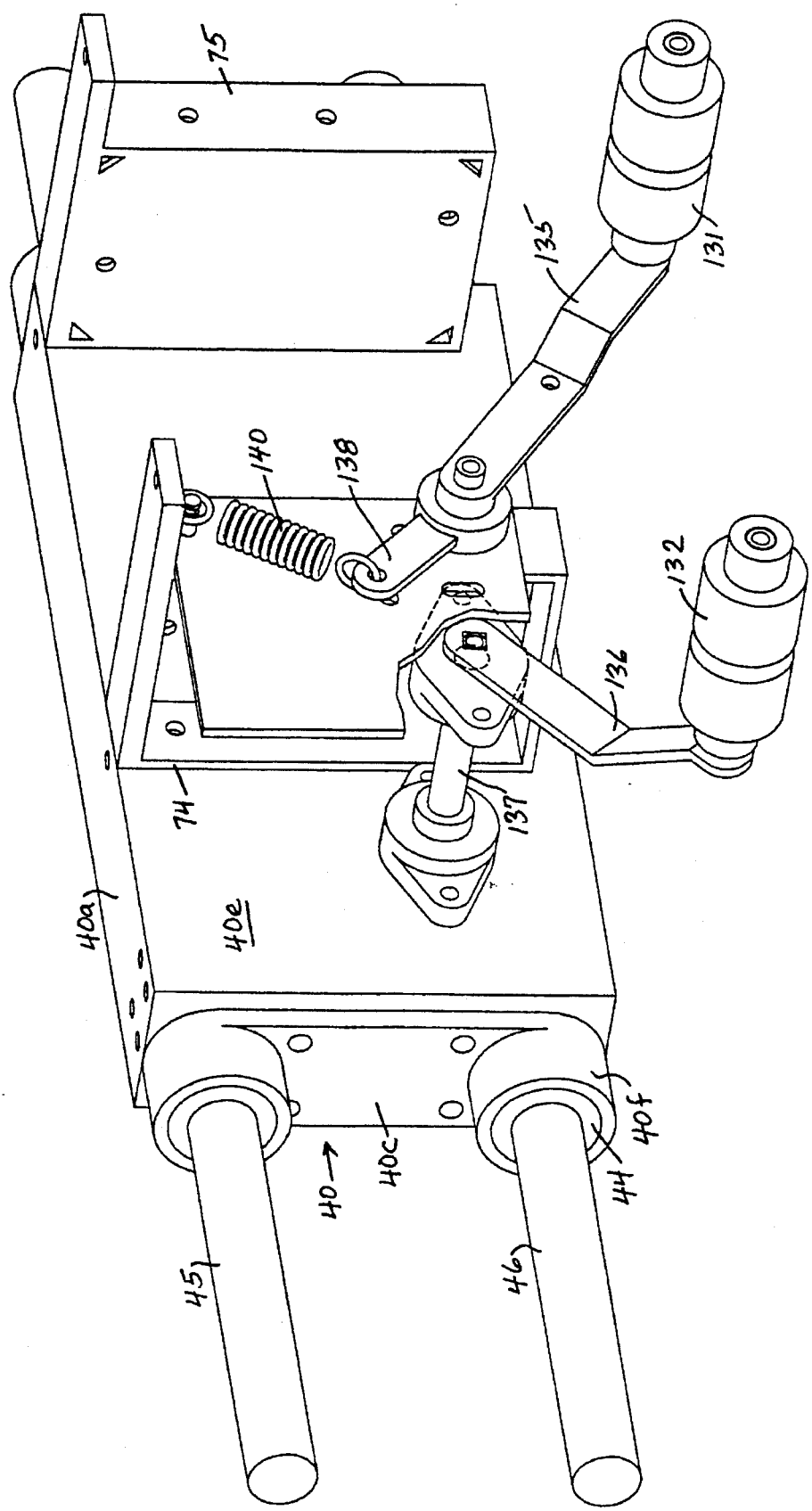
FIG. 9 is an isometric view from the left side of the carriage looking forward showing the related hold-down rollers and associated parts, and without the deheading mechanism being shown.

The lower run of the hold-down conveyor is pressed downwardly by spring-loaded hold-down rollers 130–133. Rollers 130 and 133 are swing-mounted on the machine frame. Since it is important to apply downward pressure at the head severing and finishing locations, hold-down rollers 131–132 are carried by the carriage 40. Referring to FIG. 9, rollers 131–132 project to the left on the lower ends of respective spring-loaded arms 135–136. These arms are pivotally mounted on the left side of a vertical plate 137 secured against the outer (left) vertical face of the forward bracket 74. The roller arm 135 is swing-mounted by a pivot connection to the vertical plate 137 and has an extension 138 connected to a tension spring 140 anchored to an outreach at the top of the front bracket 74. The spring 140 opposes upward movement of roller 131. The arm 136 for the hold-down roller 132 is connected to a shaft 137 passing to the right through the vertical plate and two alined bearings 138–139, the first of which is mounted on the back of plate 137 and the second of which is mounted on the carriage mounting plate 40e. As shown in FIG. 10, the shaft 137 connects on the right side of the carriage frame to a lever arm 140 which is loaded by a counter-balancing tension spring 142. This spring is anchored to a mounting element 143 which projects forwardly from the rear end piece 40d of the carriage frame. The shaft 137 continues to the right to a lever 144 mounted on the shaft and pivotally connected to one end of a link 145 which has its other end pivotally connected to a lever 146 mounted on the shaft 90 carrying the swing arms 88–89. The function of this linkage arrangement is to control the elevation of the finishing mechanism in accordance with the elevation of the hold-down roller 132 as determined by the thickness of the deheaded fish passing beneath the hold-down roller. When the hold-down roller 132 swings upwardly, for example, responsive to passage of a larger fish, the rocker arms 88–89 carrying the finishing mechanism responsively also swing upwardly to better position the finishing tool relative to the throat of the fish. The weight of the finishing mechanism carried by the rocker arms 88–89 biases the hold-down roller 132 downward with more pressure than desired. The spring 142 counter-balances sufficient of this weight to result in the proper downward pressure applied by the roller 132.

The finishing tool is preferably spaced forwardly from the guillotine blade at a distance equal to a integer multiple of the conveyor pitch. With this arrangement the finishing tool can operate at the same time as the guillotine blade on a fish which has already been deheaded. Both the deheading and finishing operations occur while the shuttle carriage is advancing. When the shuttle carriage has then completed its return stroke, fish have advanced to the start of the deheading and finishing stations.

Figure 13:
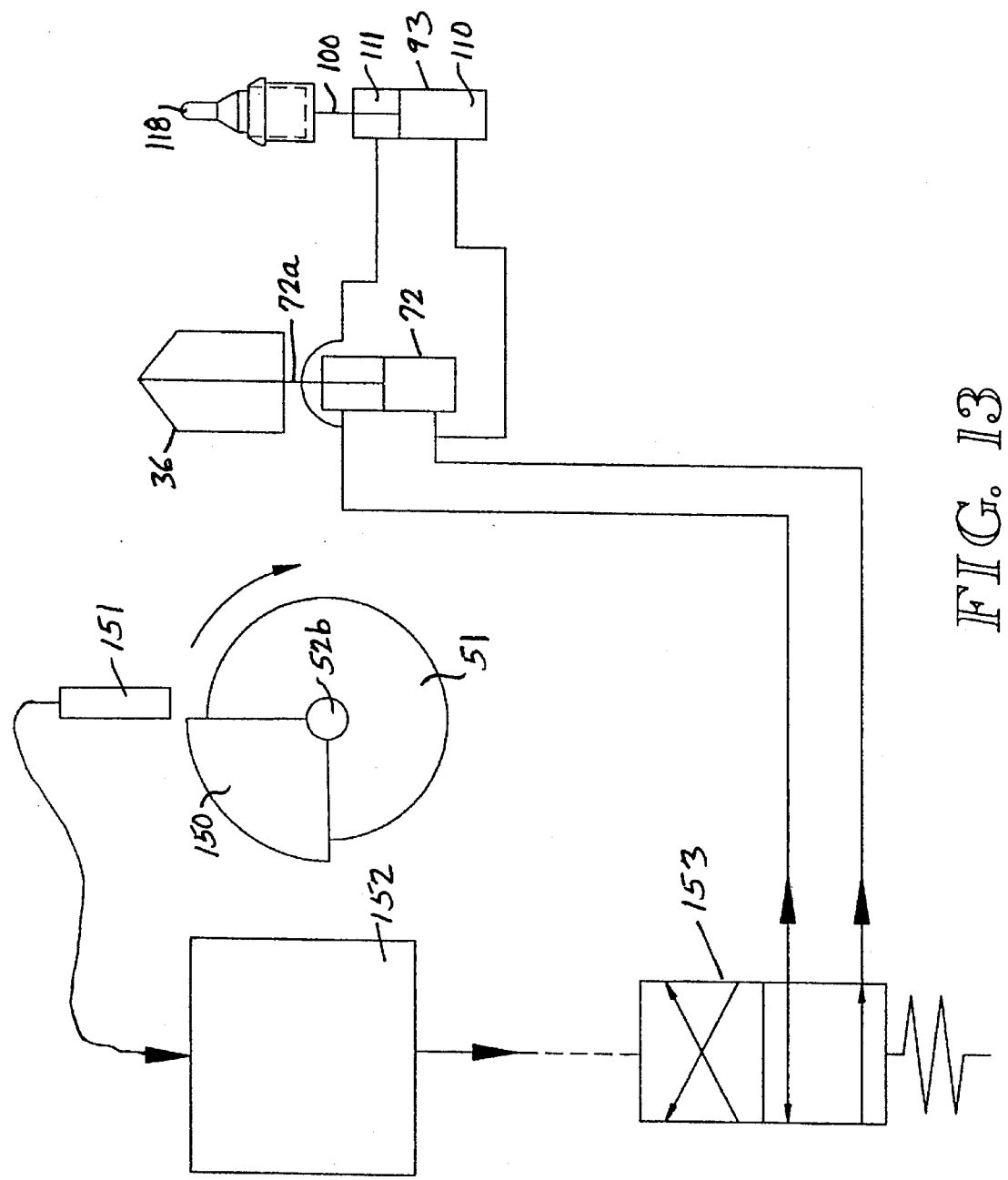
FIG. 13 is a schematic of the control system for operating the guillotine and finishing cutter.
Figure 14A:
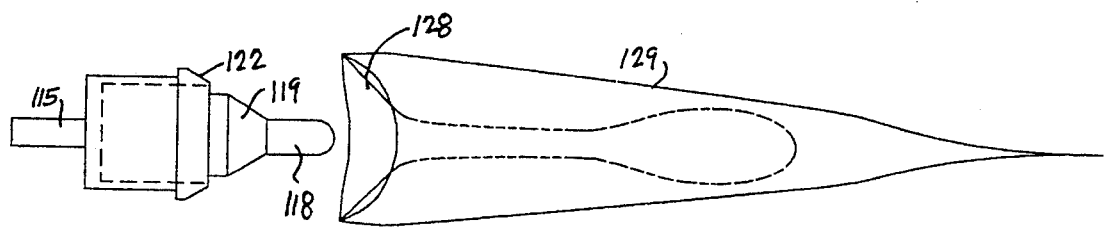
FIG. 14, frames A through D, illustrates the operational sequence of the finishing cutter on a deheaded fish.
Figure 14B:
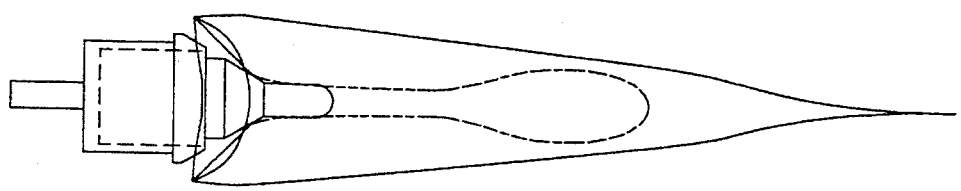
Figure 14C:
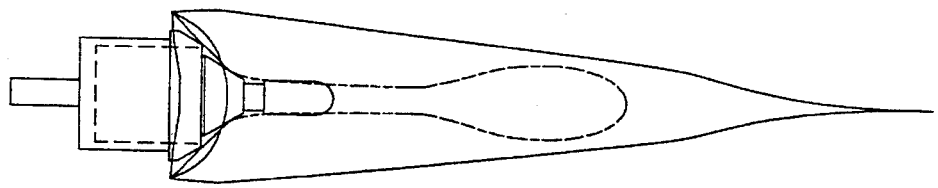
Figure 14D:
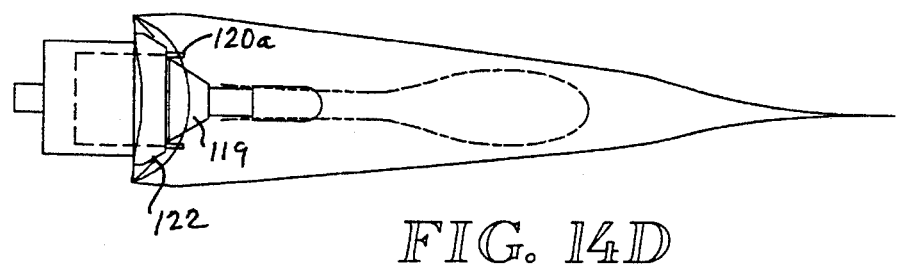

Referring to FIGS. 6 and 13, a timing quadrant 150 is mounted on the disc crank 51 and activates a proximity sensor 151 during a quarter of each shuttle cycle of the carriage 40. Preferably the quadrant 150 is positioned so that activation of the sensor 151 occurs between the first one-eighth and three-eights of the shuttle cycle so that the advancing speed of the shuttle carriage while the deheading and finishing operations are being carried out will most closely approximate the forward speed of the main conveyor. Activation of the sensor 151 signals a controller 152 for operating the solenoid of an air valve 153 having a spring return such that compressed air is supplied to the cylinders 72, 93 to responsively advance the guillotine blade and finishing tool. At the close of passage of the timing quadrant the spool of the air valve 153 shuttles to a position venting the chambers at the larger side of the pistons in the cylinders 72, 93 so that the pistons then retract responsive to pressure on the smaller side of the pistons.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:
1. A fish processing machine comprising:

an endless bottom conveyor for transporting fish along a linear processing path in a forward direction from a loading station to an unloading station;

an endless hold-down conveyor above said bottom conveyor for holding fish against the bottom conveyor while being processed;

advancing means for advancing said conveyors at a like predetermined constant speed along said path;

spacer elements on the bottom conveyor spaced apart along said path at a predetermined constant space interval for positioning fish on the bottom conveyor at said interval for processing;

fish processing means beside said path;

cycling means for reciprocating said fish processing means forward and backward in a predetermined travel cycle; and operating means for operating said fish processing means while moving forward in said travel cycle and located opposite fish transported along said path on said bottom conveyor.

2. A fish processing machine according to claim 1 in which said fish processing means includes a vertically mounted guillotine blade followed by a rotary cutting tool having a generally horizontal operating axis extending crosswise of said path.

3. A fish processing machine according to claim 1 in which said travel cycle has a total time period equal to the time period for one of said spacer elements to advance a distance equal to said space interval.

4. A fish processing machine according to claim 1 in which said fish processing means includes a fish processing unit having a guillotine blade mounted for vertical movement for severing the heads of fish transported along said processing path with the heads projecting from one side edge of said bottom conveyor.

5. A fish processing machine according to claim 4 in which adjustment means are provided to selectively turn said fish processing unit about a vertical axis to turn said guillotine blade about a vertical axis, and to selectively move said fish processing unit toward and away from said conveyors to move said guillotine blade laterally of said processing path.

6. A fish processing machine according to claim 4 in which said cycling means includes a shuttle frame providing a generally horizontal support on which said fish processing unit is adjustably seated with said guillotine blade in vertical position; and adjustment means for selectively turning the guillotine blade about a vertical axis and for selectively moving the guillotine blade on said support in a direction laterally of said processing path.

7. A fish processing machine according to claim 1 in which said fish processing means includes a rotary cutting tool having a rotary axis extending crosswise of said processing path, and means for reciprocating said tool along said rotary axis.

8. A fish processing unit according to claim 1 in which a fish head positioning conveyor extends along one side of an initial part of said bottom conveyor and ends adjacent said fish processing means, and in which said hold-down conveyor commences before said positioning conveyor ends.

9. A fish processing machine comprising:

an endless bottom conveyor for transporting fish along a linear processing path in a forward direction from a loading station to an unloading station;

an endless hold-down conveyor above said bottom conveyor for holding fish against the bottom conveyor while being processed;

advancing means for advancing said conveyors at a like predetermined constant speed along said path;

spacer elements on the bottom conveyor spaced apart along said path at a predetermined constant space interval for positioning fish on the bottom conveyor at said interval for processing;

first and second fish processing units beside said path and spaced apart endwise of said path;

cycling means for reciprocating said fish processing units together forward and backward in a predetermined travel cycle; and means for operating said fish processing units while they are moving forwardly and are opposite fish transported along said path on said bottom conveyor.

10. A fish processing machine according to claim 9 in which said first fish processing unit includes a guillotine blade mounted for vertical movement for severing the heads of fish transported along said processing path with the heads projecting from one side edge of said bottom conveyor;

and said second fish processing machine includes a rotary cutter mounted for endwise movement crosswise of said path for cutting the throat tissue of a fish free from the body after deheading.

11. A fish processing machine comprising:

conveyor means for transporting fish along a linear processing path in a forward direction from a loading station to an unloading station;

a guided shuttle adjacent said processing path;

cycling means for reciprocating said shuttle forward and backward parallel to said processing path in a travel cycle having a predetermined time period;

fish processing means mounted on said shuttle frame;

and operating means for operating said fish processing means while said shuttle is moving forward in said travel cycle and is opposite fish being transported along said path by said conveyor means.

12. A fish processing machine according to claim 11 in which said conveyor means includes a bottom conveyor for supporting the fish and a hold-down conveyor above the bottom conveyor for holding fish against the bottom conveyor, and includes advancing means for advancing said conveyors at the same speed.

13. A fish processing machine according to claim 12 in which said cycling means includes a crank, a connecting rod between said crank and shuttle frame, and drive means for rotating said crank one revolution in a said time period, and in which said advancing means and drive means comprise a first sprocket coupled to said crank, a second sprocket arranged to drive said bottom conveyor, a third sprocket arranged to drive said hold-down conveyor, and an endless drive chain engaging said sprockets such that all three sprockets have the same direction of rotation.

14. A fish processing machine according to claim 13 in which said second and third sprockets have a like number of teeth selected relative to the number of teeth in the first sprocket such as to advance said conveyors one said space interval for each revolution of said first sprocket and crank.

15. A fish processing machine according to claim 11 in which said fish processing means includes a cutter shaft having a rotary axis generally transverse to said processing path, a rotary cutter rotatively mounted on said cutter shaft, and means for rotating said cutter on said cutter shaft;

said operating means including means for selectively advancing said cutter shaft axially toward said processing path into operating position and for selectively retracting said cutter shaft while said shuttle frame is moving forward in said travel cycle.

16. A fish processing machine comprising:

an endless bottom conveyor having an upper run for transporting fish along a linear processing path in a forward direction from a loading station to an unloading station;

an endless hold-down conveyor above said bottom conveyor and having a bottom run for holding fish against the bottom conveyor while being processed;

a hold-down roller engaging said bottom run;

advancing means for advancing said upper run and said bottom run at a like predetermined constant speed along said path;

a fish processing mechanism beside said path;

cycling means including a carriage for reciprocating said fish processing mechanism forward and backward in a predetermined travel cycle, said hold-down roller being carried by said carriage to apply downward pressure on said bottom run adjacent said fish processing mechanism; and operating means for operating said fish processing means while moving forward in said travel cycle and located opposite fish transported along said path on said bottom conveyor.

17. A fish processing machine according to claim 16 in which said hold-down roller is swing-mounted on said carriage on a first shaft;

a second shaft on said carriage;

rocker arms on said second shaft arranged to swing up and down responsive to up and down swinging movement of said hold-down roller, said fish processing mechanism being carried by said rocker arms;

linkage between said shafts whereby the weight of said fish processing mechanism downwardly loads said one hold-down roller;

and a counter balancing spring connected to a lever on one of said shafts for countering part of the weight of said fish processing mechanism.

\* \* \* \* \*